United States Patent [19]

Paech

[11] 4,408,766
[45] Oct. 11, 1983

[54] ROTARY SEAL APPARATUS WITH DUAL SELF-CENTERING ANNULAR FACE SEALS

[75] Inventor: Ivor N. Paech, Edwardstown, Australia

[73] Assignee: Longyear Australia Pty. Ltd., Mitchell Park, Australia

[21] Appl. No.: 445,351

[22] Filed: Nov. 29, 1982

[51] Int. Cl.³ .............................................. F16J 15/34
[52] U.S. Cl. .......................................... 277/3; 277/27; 277/59; 277/65; 277/83
[58] Field of Search ............... 277/3, 27, 59, 65, 81 R, 277/83, 173

[56] References Cited

U.S. PATENT DOCUMENTS

| | | | |
|---|---|---|---|
| 2,930,608 | 3/1960 | Hogan et al. | 277/27 X |
| 3,006,667 | 10/1961 | Stephens | 277/27 |
| 3,602,520 | 8/1971 | Wallis | 277/27 |
| 4,071,253 | 1/1978 | Heinen et al. | 277/65 X |
| 4,109,920 | 8/1978 | Wiese | 277/65 X |

Primary Examiner—Robert S. Ward, Jr.
Attorney, Agent, or Firm—Clayton R. Johnson

[57] ABSTRACT

Rotary seal apparatus for permitting the transfer of fluid under pressure from a stationary housing port to a passage in a spindle rotatably mounted by the housing and then to, for example, a chuck mounted by the spindle, that includes sealing subassemblies on axial opposite sides of the port in fluid sealing relationship with the housing interior, which in conjunction with the spindle and housing provide a seal chamber and form an annular clearance space with the spindle to permit leakage fluid flow from said chamber, and a pair of annular seals mounted in said chamber and on the spindle for limited free axial and radial movement relative one another, the stationary housing and the spindle. The seals each have an internal tapered surface which gives a self centering action when fluid under pressure flows between them and the spindle to eliminate concentricity problems and are axially spaced to form face seals with the adjacent subassembly. The minimum annular clearance between the seals and spindle is less than that between the spindle and subassemblies to limit leakage flow to the clearance spaces between the housing and subassemblies.

11 Claims, 7 Drawing Figures

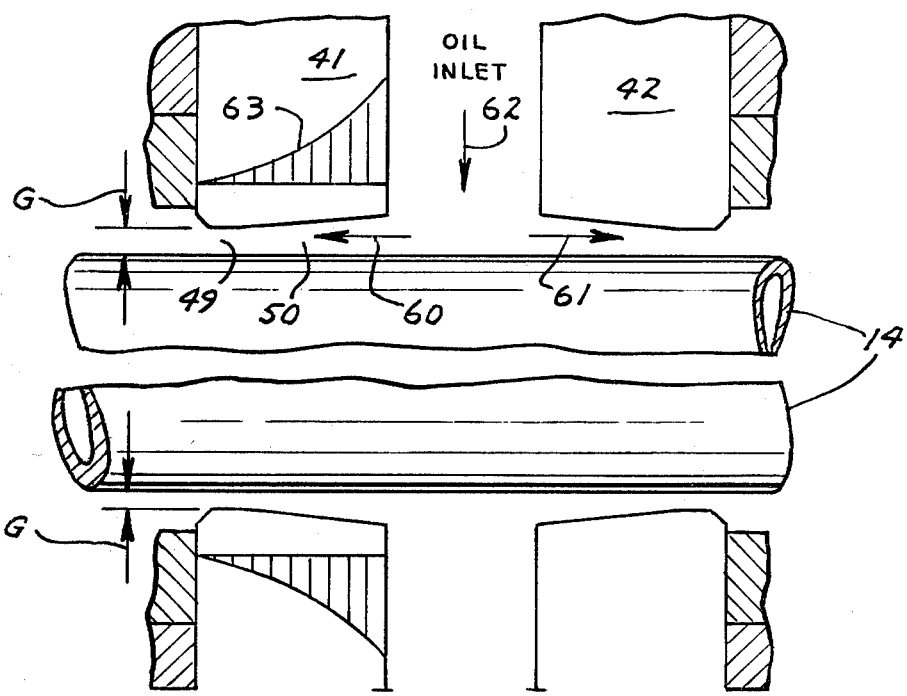
FIG. 5
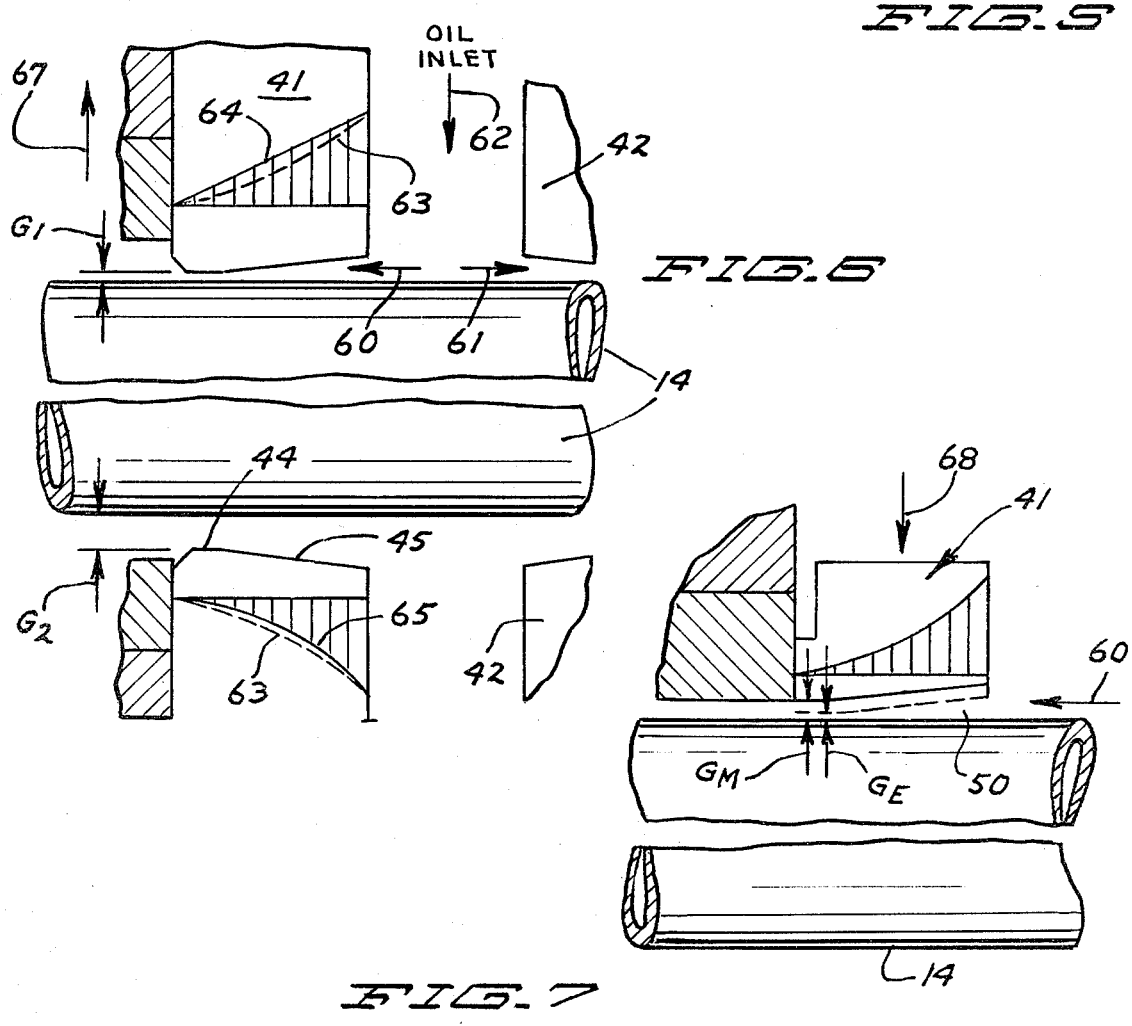
FIG. 6
FIG. 7

1

ROTARY SEAL APPARATUS WITH DUAL SELF-CENTERING ANNULAR FACE SEALS

BACKGROUND OF THE INVENTION

Rotary seal apparatus for permitting the transfer of fluid from a stationary housing into a rotating tube or shaft without excessive oil leakage.

U.S. Pat. Nos. 3,565,187 and 3,613,804 disclose hydraulically actuated chuck apparatus that includes a chuck having a rotary housing extended into a stationary housing with hydraulic fluid under pressure transferred from the stationary housing into the rotary housing and some fluid permitted to leak through a clearance gap between the housings and return to the sump. U.S. Pat. No. 3,103,144 discloses a hydraulically operated collet clamp having a rotatably driven sleeve with an axial passage therein for conducting hydraulic fluid to a collet mounted thereon. A rotary seal is provided between the drive sleeve and a stationary housing from which hydraulic fluid is transferred to the passage in the sleeve. Leakage fluid passing between the rotary sealing surfaces passes through bearings that rotatably mount the sleeve on the housing and is returned to the sump.

U.S. Pat. No. 4,294,454 discloses a stationary housing having spaced seal rings that each carries a seal ring and a shaft that mounts adjacent seal rings which are resiliently urged apart to sealingly contact the respective last mentioned seal ring and provide a fluid flow path between a housing passage and a shaft passage. U.S. Pat. No. 3,122,373 discloses a housing and a shaft wherein two seals under fluid pressure are urged axially apart to form fluid seals with axially spaced seal members.

In order to provide improved rotary seal mechanism between a stationary housing and a rotary drivable member such as a tubular spindle or shaft to enable high pressure hydraulic fluid to be transmitted from the housing to a passage in the drivable member with limited fluid leakage, this invention has been made.

SUMMARY OF THE INVENTION

Rotary seal apparatus for providing a seal between a stationary housing and a drivable member such as a shaft or tubular spindle having a fluid passage therein to enable high pressure hydraulic fluid to be transmitted from the housing to the passage without excessive leakage, axially spaced seal subassemblies to form a fluid seal with radially adjacent inner peripheral wall portions of the housing and provide an annular clearance space around the drivable member, and a pair of annular seals axially between the seal subassemblies that are axially and radially movable a limited amount relative one another, the seal subassemblies, the housing and drivable member; and upon application of fluid under pressure through the housing inlet are self centered relative the drivable member, moved axially apart to effect a total face seal with the adjacent seal subassembly, cease rotation and provide a controlled fluid leakage between the seals and drivable member while fluid flows from the housing inlet to the drivable member passage.

In a hydraulically driven drill that is specifically designed for underground core drilling and includes a chuck/spindle system as a part thereof and utilizes hydraulic oil to close the chuck, the hydraulic pressure to the chuck may vary between 3,000 psi and 4,500 psi depending on the drilling function. The chuck is required to operate while the spindle is stationary; slowly rotating in either direction, for example when making or breaking rod joints; or rotating at high speeds while drilling; for example 1,000 rpm-2,500 rpm. It is not considered feasible to effect a total seal i.e. with zero leakage as the speeds and pressures preclude the use of conventional lip seals or mechanical seals. A controlled leakage seal has therefore been developed to allow a small leakage of oil from the high pressure area to a low pressure (drain) region. This is achieved by a small controlled clearance between a rotating component and a stationary component.

One of the objects of this invention is to provide new and novel rotary seal apparatus for enabling high pressure hydraulic fluid to be transmitted from a stationary housing into a drivenly rotatable member passage while a small leakage of hydraulic fluid takes place from a high pressure area to a low pressure drain region. In furtherance of the above object, it is an additional object of this invention to provide new and novel seals between the housing and a drivenly rotatably member that are axially and radially movable a limited amount relative the housing and drivenly rotatable member and are axially spaced and self centered relative the drivenly rotatable member when hydraulic fluid is being transmitted from the housing to the drivenly rotatably member.

BRIEF DESCRIPTION OF THE DRAWINGS

FIG. 5 is a schematic illustration showing the pressure profile when the seal of FIG. 3 is concentric to the spindle.

FIG. 6 is an illustration similar to FIG. 5 other than the pressure distribution for the seal in a centered condition is represented in dotted lines and the approximate pressure distribution when the seal is no longer centered relative the spindle in solid lines; and FIG. 7 is a showing of a seal with a manufactured gap between it and the spindle indicated in solid lines and the final equilibrium gap established under pressure indicated in dotted lines.

Referring now to FIGS. 1 and 2, the spindle housing 10 of a drill specifically designed for underground core drilling mounts axially spaced bearings 11 and 12 which in turn mount a spindle 14 that is rotatably driven in a conventional manner. To one end of the spindle, there is bolted to rotate therewith the housing 15 of a chuck that has jaws (not shown) operated by fluid under pressure to a closed condition and resiliently retained in an open condition. An O-ring 16 is provided between the spindle and chuck housing while annular seal mechanism 17 is provided between the chuck and spindle housings. A plurality of fluid passages 18, for example three, are provided in the chuck housing to at their one ends open to the respective adjacent one of the axially elongated passages 19 in the spindle. Passages 18 are provided for conducting fluid to appropriate passages and structure for operating the chuck jaws (not shown). Since the chuck does not form a part of the invention, it will not be further described.

Figure 1:
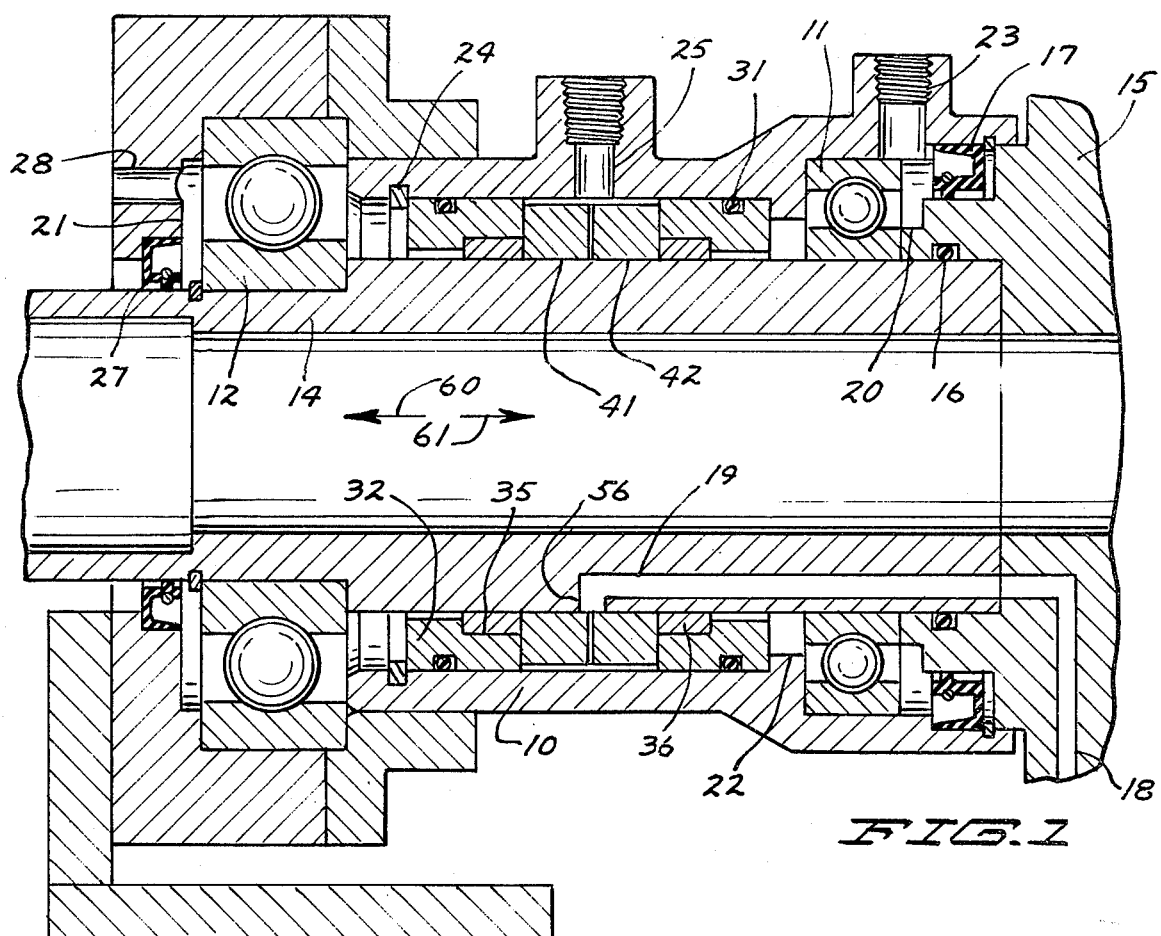
FIG. 1 is a fragmentary axially cross sectional view of the spindle, chuck and stationary housing showing the rotary seal apparatus of this invention between the housing and spindle.

The spindle housing has a reduced diameter internal flange 22 on the axial opposite side of bearing 11 from the chuck housing and an outlet port 23 that opens to an annular leakage fluid chamber 20 that is defined by the spindle housing, bearing 11, seal mechanism 17 and the chuck. Axially between the bearings and adjacent bearing 12, the spindle housing has an internal annular groove that mounts a retainer ring 24. Axially between the retainer ring and the annular shoulder 22a of flange 22 that faces the retainer ring the housing is of a constant inner diameter while axially between the bearings the spindle is of a constant outer diameter. An inlet fluid passage 25 is provided to open to the housing interior mid-way between the flange shoulder and retainer ring 24. On the opposite side of bearing 12 from the retainer ring, there is provided fluid seal mechanism 27 between the spindle and spindle housing and a spindle housing outlet 28 that opens to an annular leakage fluid chamber 21 that is defined by the spindle housing, seal mechanism 27, bearing 12, spindle 14 and a retainer ring mounted on the spindle in abutting relationship with the bearing.

Axially spaced housing seal subassemblies are provided in the stationary housing axially between retainer ring 24 and flange shoulder 22a, the subassemblies respectively include a seal member 32 abutting against ring 24 and a seal member 33 abutting against the shoulder, an O-ring 31 mounted in an annular groove in the respective seal member in fluid sealing relationship with the housing inner peripheral wall and wear rings 35 and 36 that are mounted in a cut-out 34 in the respective seal member which opens radially toward the spindle and axially toward the other seal member. The inner diameters of the wear rings are greater than the outer diameter of the spindle to provide annular clearance spaces 37 while the inner diameters of the non-cut-out parts of the seal members are greater than the adjacent part of the spindle to provide annular clearance 38 that each is of a greater radial thickness than that of a clearance space 37. The seal subassemblies in conjunction with the housing and spindle provide a seal chamber into which inlet passage 25 opens while providing clearance spaces for leakage fluid to flow in axial opposite directions from the chamber and along the spindle.

Figure 2:
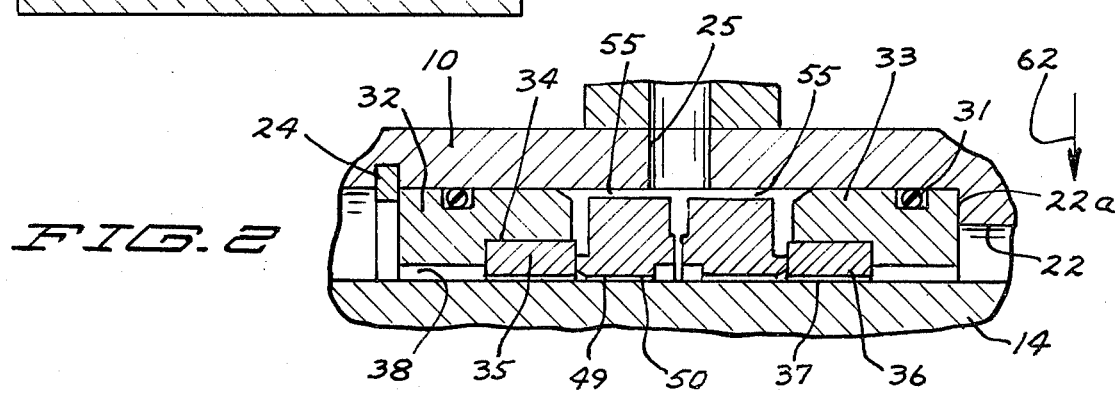
FIG. 2 is an enlarged view of a portion of FIG. 1 to more clearly show the seal apparatus.
Figure 3:
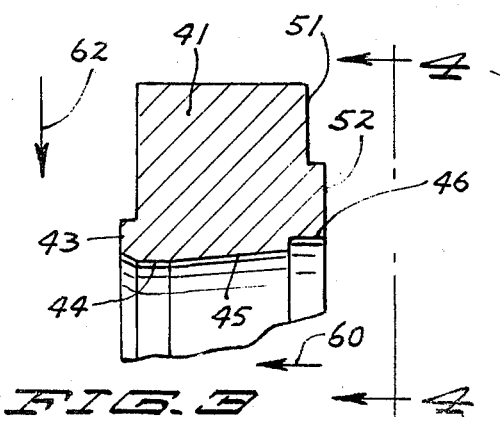
FIG. 3 is a still further enlarged fragmentary view, part in cross section, of one of the seals, the angle of taper of the taper part of the inner peripheral wall being exaggerated to facilitate the illustration thereof.

Axially between the seal members and in the seal chamber there are rotary seals, generally designated 41 and 42 respectively. The seals are of the same size and shape, but are oppositely faced. Referring to FIG. 3 wherein seal 41 is shown in the same relationship as shown in FIGS. 1 and 2, the seal at one axial end has a radially inner peripheral beveled surface and an annular cut out that provide an annular flange or lip 43 having an annular transverse planar surface (face) for abutting against the adjacent annular transverse planar surface of the wear ring for forming a fluid seal therewith. The outer diameter of the lip is less than that of the wear ring and the axial length of the wear ring is slightly greater than that of cut-out 34 whereby the seal is prevented from abutting against the adjacent seal member.

Seal 41 has a constant inner diameter (circular cylindrical) peripheral wall portion 44 that extends axially from the beveled surface toward the other seal and an internal tapered wall portion 45 that is tapered at a small angle and extends axially from wall portion 44 to the transverse surface of the radially inner cut-out 46 of the seal. The minimum inner diameter of the seal which is less than that of the wear ring but sufficiently greater than that of the adjacent part of the spindle to provide an annular clearance space (gap) 49 is that of wall portion 44. The angle of taper of wall portion 45 is such that the inner diameters of wall portion 45 of one seal progressively increases in an axial direction toward the other seal to provide an annular clearance space (gap) 50 that is of an increasing radial thickness in said axial direction. The axial length of the tapered portion is several times that of wall portion 44.

Figure 4:
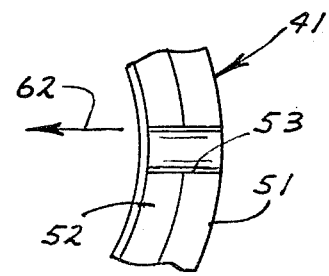
FIG. 4 is a fragmentary transverse view generally taken along the line and in the direction of the arrows 4—4 of FIG. 3 other than for being angularly offset from the part of the seal shown in FIG. 3.

The end of seal 41 axially opposite lip 43 has a radially outer annular cut-out 51 that in conjunction with cut-out 46 and a pair of diametrically opposed notches 53 (only one shown in FIG. 4) provide transverse (radial) planar surfaces 52 that are axially adjacent those of the other seal. The radial dimensions of surfaces 52 and cut-out 51 may be about the same and are greater than those of cut-out 46. The axial depth of each notch is greater than that of cut-out 51 but less than that of cut-out 46. The cross sectional area of the notches when surfaces 52 of the seals abut is less than that of inlet passage 25. Further, the maximum outer diameter of each of the seals is sufficiently less than that of the radially adjacent parts of the spindle housing inner peripheral wall to provide annular clearance spaces 55 between the seals and housing. The radially dimensions of clearance spaces 55 are greater than that of clearance spaces 49.

The axial spacing between the adjacent transverse surfaces of the wear rings are sufficiently greater than that of the combined maximum axial dimensions of the seals to permit limited axial movement of the seals relative one another and the wear rings. The spindle has radial passages 56 that at their one ends open to passages 19 and at their opposite ends through the spindle outer circumferential wall to the seal chamber adjacent seal cut-outs 46.

In use with the spindle rotating and no hydraulic fluid (oil) under pressure being applied to housing inlet port 25, the seals 41, 42 may or may not be rotating and may or may not be in contact with the adjacent wear ring. Upon applying oil under pressure to port 25, if one of the seals has its lip out of contact with the adjacent wear ring, there is a relatively large flow of oil axially between the radially adjacent circumferential surfaces of the spindle housing and seal, then radially inwardly (arrow 62) between the axially adjacent surfaces of the seal and seal member and wear ring and thence axially through clearance spaces 37, 38, the respective bearing and outlet passage in the spindle housing. This radially inward flow results in a reduced pressure over the said axially adjacent surface of the seal which then causes the seal to move axially along the spindle and into contact with the adjacent wear ring, thereby forming a total face seal. At this time, the seals cease rotation if they were rotating, and are axially spaced.

Oil at high pressure flows radially between the seals and enters through the passages 56 (for example 3) and thence through passages 19, 18 for operating the jaws of chuck 15 to a closed position.

Additionally oil leaks between the inner peripheral surfaces of the seals and outer peripheral surfaces of the spindle to flow in opposite axial directions (arrows 60, 61) through the clearance spaces 50, 49 and then to flow through the relative large clearance spaces 37, 38 and subsequently through outlets 28, 23 to the oil reservoir (sump). The seals are made of mild steel and have an internal taper which gives them a self-centering action to prevent contact with the spindle when oil flows between them and the spindle.

When the seals are concentric to the spindle and considering the leakage oil flowing in the direction of arrow 60 between the seal 41 and the spindle, the velocity of oil increases as a result of tapered surface 45. This results in the pressure decreasing along the tapered surface in the direction of arrow 60 as the velocity increases. The approximate pressure distribution between the spindle and seal 41 is shown by curve 63 in FIG. 5. Assuming the seal I.D. and spindle O.D. are perfectly round and the spindle concentric to the spindle, the pressure distribution would be constant around the periphery of the spindle and thus no net hydraulic force tending to displace the seal in any direction. Accordingly, the gap "G" remains constant.

Assuming the seal 41 is displaced slightly so that it no longer is concentric to the spindle, the original gap G decreases to gap $G_1$ at one point on the periphery of the spindle and increases to $G_2$ at a position directly opposite $G_1$. The reduced gap $G_1$ restricts the axial flow of oil which results in a reduced oil velocity and a pressure increase with a modified approximate pressure distribution indicated by solid line 64 in FIG. 6. In FIG. 6 dotted lines 63 indicate the pressure distribution when the seal is concentric to the shaft.

Similarly the increased gap $G_2$ allows more axial flow of oil and an increased velocity along the tapered part of the seal. This results in a lower pressure distribution indicated by line 65 in FIG. 6. As may be seen, the pressure distribution is highest where the gap narrowest. This results in a net force acting in the direction of arrow 67 for moving the seal into a position concentric to the shaft such that $G_1$ equals $G_2$.

Referring to FIG. 7, the seal is manufactured to have a geometric gap $G_M$ between it and the spindle when concentric to the spindle and no oil under pressure is applied to the seal chamber. When oil under pressure is applied to the seal chamber, an oil flow and pressure distribution is established between the seal and spindle as previously described. The pressure decreases axially from the pressure at the inlet between the seal and spindle to the pressure at the outlet between the seal and spindle in a manner that which depends on the velocity distribution and taper.

The outer circumferential surface of the seal is subject to the full pressure at the inlet of port 25 to the housing interior. Thus there is a pressure unbalance between the outer and inner circumferential surfaces of the seal with a resulting tendency for the seal to be collapsed onto the shaft. The direction of the resultant hydraulic force on the seal is indicated by arrow 68. The degree of hydraulic collapse depends on the elastic property of the seal which in turn is a function of the inner and outer diameters of the seal and material the seal is made of.

The hydraulic collapse can be controlled so that the seal contracts elastically around the shaft. If the seal I.D. is perfectly round, the seal can be made to shrink concentrically around the spindle so that gap $G_M$ is reduced and the oil flow between the spindle and seal is reduced. As the gap is reduced, the pressure distribution over the tapered portion 50 of the seal increases. The increased pressure between the seal and spindle resists the elastic collapse of the seal until an equilibrium gap $G_E$ is established. Accordingly, the seal can be made so that the final operating gap $G_E$ is less than the initial installed gap $G_M$ with the seal to spindle clearance compensating and the final operating gap $G_E$ established with less dependence on $G_M$. Thus manufacturing tolerances can be increased so that even though $G_M$ may be relatively large, the final reduced operating gap $G_E$ will be established under pressure. Similarly the gap $G_E$ will be established even if wear occurs on the seal or spindle. The seal must be so proportioned that the final operating gap $G_E$ allows the correct oil flow and hence leakage through the seal.

Even though the seal apparatus has been disclosed with reference to a spindle, it can be used with other rotary drivable tubular members, or shafts having one or more passages therein for conducting fluid under pressure to other structure.

As one example of the invention but not otherwise as a limitation therein, the outer diameter of the spindle at clearance space 49 may be about 90 mm, the gap G about 0.06 mm, the maximum axial movement of a seal about 0.12 mm and the angle of taper of the tapered surface of a seal about a tenth of a degree.

What is claimed is:

1. Rotary seal apparatus for permitting the transfer of fluid under pressure from an inlet in a stationry housing having an inner circumferential wall portion to an inlet of a passage in a drivable member rotatably mounted by the housing while permitting leakage fluid to flow in opposite axial directions from the housing inlet to housing outlets comprising first and second annular sealing means respectively mounted axially between the housing inlet and drivable member inlet and one of the housing outlets, and the housing inlet and drivable member inlet and the other of the housing outlets for forming fluid seals with the housing circumferential wall portion, in conjunction with the drivable member and housing forming a seal chamber to which said inlets open, and in conjunction with the drivable member provide annular leakage fluid clearance spaces that open to the seal chamber, said first and second means having axially adjacent annular sealing surfaces, and a first and second annular seal mounted in the seal chamber to surround the drivable member, said seals being freely rotatably and axially movable relative one another, the drivable member and the housing when no fluid under pressure is applied at the housing inlet, and having axially remote ends that have annular surfaces for abutting against the axially adjacent one of the first and second means sealing surface to form fluid seals therewith when fluid under pressure is applied to the seal chamber, axially adjacent ends that have radially extending surfaces abuttable against one another when no fluid under pressure is applied to the housing inlet and inner circumferential surfaces to provide an annular clearance space with the drivable member to permit leakage fluid flowing therethrough to the first and second means clearance spaces when fluid under pressure is applied to the housing inlet to flow radially between the seals to the drivable member inlet, the housing inlet and drivable member inlet opening radially to the seal chamber adjacent the axially adjacent ends of the seals.

2. The rotary seal apparatus of claim 1 further characterized in that the seals inner circumferential surfaces include annular axially tapered surface portions that are tapered to be of increasing inner diameters in axial directions toward one another to provide the respective seal with a self-centering action when fluid under pressure is applied to the housing inlet.

3. The rotary seal apparatus of claim 2 further characterized in that the seals inner circumferential surfaces include constant inner diameter surface portions that are axially opposite the tapered surface portions from one another, define minimum inner diameter parts of the seals and are of smaller diameters than the minimum inner diameters of the first and second means.

4. The rotary seal apparatus of claim 2 further characterized in that the seals have annular cut-outs that open radially toward the housing inner wall portion and axially toward the adjacent one of the first and second means to in part provide annular lips having the seals remote ends annular surfaces, the maximum outer diameters of the lips being substantially less than the maximum outer diameters of the seals.

5. The rotary seal apparatus of claim 4 further characterized in that the first and second means each includes an annular seal member having an annular cut-out opening radially toward the drivable member and axially toward the adjacent seal and a wear ring in the cut-out that is abuttable against the adjacent lip, the maximum diameter of the wear ring being substantially less than that of the maximum diameter of the seal member.

6. Rotary seal apparatus for permitting the transfer of fluid under pressure from an inlet in a stationary housing having an inner circumferential wall portion to an inlet of a passage in a drivable member rotatably mounted by the housing while permitting leakage fluid to flow in opposite axial directions from the housing inlet to housing outlets axially remote from and on axially opposite sides of the inlets, comprising first and second annular sealing means respectively mounted axially between the inlets and one of the outlets, and the inlets and the other of the outlets for forming fluid seals with the housing circumferential wall portion, in conjunction with the drivable member providing annular leakage fluid clearance spaces, and in conjunction with the housing and drivable member forming a seal chamber, and a first and a second annular seal mounted in the seal chamber in surrounding relationship to the drivable member for forming a fluid seal with the first and second means respectively and annular clearance spaces with the drivable member to permit leakage fluid to flow in axially opposite directions from the seal chamber to the first and second means clearance spaces while fluid flows from the housing inlet to the drivable member inlet when fluid under pressure is applied to the housing inlet, the seals having inner peripheral wall portions that are axially tapered to be of decreasing inner diameters axially away from one another to provide seal self-centering properties when fluid under pressure is applied to the housing inlet.

7. The rotary seal apparatus of claim 6 further characterized in that the seals are of axially dimensions for moving between a position abutting against one another and out of contact with the first and second means, and a second position axially spaced from one another with the inlets opening to the seal chamber at least in part axially between the seals and the seals in sealing contact with the respective adjacent one of the first and second means.

8. The rotary seal apparatus of claim 6 further characterized in that the seals have inner peripheral wall portions on the axially opposite sides of the tapered wall portions that define the minimum inner diameter parts of the seals and are of smaller diameters than the minimum diameters of the first and second means.

9. The rotary seal apparatus of claim 6 further characterized in that the seals each has an annular flange that is fluid sealingly abuttable against the adjacent one of the first and second means and of an outer diameter smaller than the maximum outer diameter of the seal to provide a clearance space radially between the flange and housing wall portion and axially between the seal and the respective one of the first and second means, the maximum outer diameters of the seals being less than the inner diameter of the housing circumferential wall portion to provide annular clearance spaces that in conjunction with the last mentioned clearance spaces extend the axial lengths of the seals.

10. The combination of a circular cylindrical tubular member having axially opposite end portions, at least one axially extending passage that opens through one tubular member end portion, an outer circumferential wall, and an inlet opening to each passage and through the outer circumferential wall, a stationary housing having an inner peripheral wall portion surrounding an axially elongated portion of the tubular member, first and second bearing means mounted by the housing in axial spaced relationship for rotatably mounting the tubular member, the housing, tubular member and bearing means providing leakage fluid annular chambers on axial opposite sides of the bearing means for receiving leakage fluid passing through the bearing means, the housing having an outlet opening to each of the leakage fluid chambers, first and second sealing means mounted in the housing axially between the first and second bearing means and axially spaced from one another for forming fluid seals with housing inner peripheral wall portion, radially spaced from the tubular member to provide annular fluid leakage clearance spaces to permit leakage fluid flowing to the bearing means, and in conjunction with the housing and tubular member form a seal chamber that opens axially to the last mentioned clearance spaces and radially to the inlets, a first rotary annular seal mounted in said seal chamber for forming a fluid seal with the first sealing means when fluid under pressure is applied at the housing inlet, and a second rotary annular seal mounted in the seal chamber axially between the first seal and second sealing means for forming a fluid seal with the second sealing means and axially spaced from the first seal to provide a fluid flow path from the housing inlet, radially between the seals and to the tubular member inlet when fluid under pressure is applied to the housing inlet, the first and second seals having minimum inner diameters to provide annular clearance spaces with the tubular member for leakage fluid to flow through in axial opposite directions to the first and second sealing means clearance spaces respectively when fluid under pressure is applied to the housing inlet, and being freely axially movable and rotatably movable relative one another when no fluid under pressure is applied to the housing inlet.

11. The combination of claim 10 further characterized in that the seals have internal, axially adjacent, annular tapered surface portions that are of progressively increasing diameters toward one another so that the seals have a self-centering action when fluid under pressure is applied to the housing inlet.

* * * * *